United States Patent
Anders et al.

(10) Patent No.: US 10,956,517 B2
(45) Date of Patent: Mar. 23, 2021

(54) HOLISTIC MAPPING AND RELOCATION OF SOCIAL MEDIA ASSETS

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US); Mark Leftwich, Ascot (GB); Anthony Whelan, Ballyjamesduff (IE); Darrius Plantz, Georgetown, TX (US); Kimberly Dawn McCall, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/015,493

(22) Filed: Jun. 22, 2018

(65) Prior Publication Data
US 2019/0392079 A1    Dec. 26, 2019

(51) Int. Cl.
G06F 16/951 (2019.01)
G06F 11/14 (2006.01)
G06N 20/00 (2019.01)

(52) U.S. Cl.
CPC ........ *G06F 16/951* (2019.01); *G06F 11/1448* (2013.01); *G06N 20/00* (2019.01); *G06F 2201/80* (2013.01); *G06F 2201/84* (2013.01)

(58) Field of Classification Search
None
See application file for complete search history.

(56) References Cited

U.S. PATENT DOCUMENTS

| 6,529,939 B1 | 3/2003 | Kraft |
| 6,850,900 B1 | 2/2005 | Hare et al. |
| 6,947,959 B1 | 9/2005 | Gill |
| 9,191,380 B2 | 11/2015 | Anderson et al. |

(Continued)

FOREIGN PATENT DOCUMENTS

JP    2006072494 A    3/2006

OTHER PUBLICATIONS

Mell, et al., "The NIST Definition of Cloud Computing," National Institute of Standards and Technology, U.S. Department of Commerce, Special Publication 800-145, Sep. 2011, pp. 1-7.

(Continued)

*Primary Examiner* — Wilson Lee
(74) *Attorney, Agent, or Firm* — Michael O'Keefe (57) ABSTRACT

A method, computer program product, and system for generating holistic maps and relocating social media assets. The computer may receive a plurality of social media assets to be relocated or merged from a user. A snapshot of each asset within the plurality of social media assets may be generated. The snapshot may be a record of the plurality of social media assets at any one time. A machine learning model may be generated for the plurality of social media assets based on the generated snapshot. A projected location may be identified based on the generated machine learning model. A new snapshot may be generated based on the projected location. It may be determined whether a transaction was successful based on a comparison of the snapshot with the new snapshot. An action may be performed based on the determination.

17 Claims, 5 Drawing Sheets

(56) References Cited

U.S. PATENT DOCUMENTS

| | | | |
|---|---|---|---|
| 9,880,715 B2 | 1/2018 | Behar et al. | |
| 2007/0106650 A1 | 5/2007 | Moore | |
| 2011/0296476 A1 | 12/2011 | Rouse et al. | |
| 2014/0006354 A1* | 1/2014 | Parkison | G06F 3/0611 |
| | | | 707/649 |
| 2014/0189534 A1* | 7/2014 | Liu | G06F 16/957 |
| | | | 715/753 |
| 2014/0372376 A1* | 12/2014 | Smith | G06F 16/178 |
| | | | 707/624 |
| 2015/0089399 A1* | 3/2015 | Megill | H04L 12/1813 |
| | | | 715/753 |
| 2015/0324224 A1* | 11/2015 | Hall | G06F 11/3636 |
| | | | 718/108 |
| 2016/0140447 A1* | 5/2016 | Cohen | G06N 5/02 |
| | | | 706/52 |
| 2016/0171107 A1* | 6/2016 | Erickson | G06F 16/211 |
| | | | 707/727 |
| 2016/0379314 A1* | 12/2016 | Trudeau | G06Q 50/01 |
| | | | 705/319 |
| 2017/0031671 A1* | 2/2017 | Joshi | G06F 11/1433 |
| 2018/0048594 A1 | 2/2018 | de Silva et al. | |
| 2018/0060191 A1* | 3/2018 | Goodman | G06F 11/00 |
| 2018/0173562 A1* | 6/2018 | Chen | G06F 16/128 |
| 2018/0188704 A1* | 7/2018 | Cella | G06N 3/02 |
| 2018/0330382 A1* | 11/2018 | Chen | H04L 63/08 |
| 2019/0303807 A1 | 10/2019 | Gueye | |

OTHER PUBLICATIONS

Biau, "Analysis of a Random Forests Model", Journal of Machine Learning Research, Issue 13, 2012, Submitted Oct. 2010, Revised Oct. 2011, Published Apr. 2012, pp. 1063-1095.

Cumbrowksi, "No Fear of Remapping URLs of your Site", Search Engine Journal, Mar. 23, 2007, pp. 1-13.

Sarris, "Best Practices of GeoInformatic Technologies for the Mapping of Archaeolandscapes", ArchaeoPress Archaeology, 2015 (best date available), pp. 1-279.

Jarad, "Mapping Cisco Security Solutions to ISO 27001", Cisco, printed May 18, 2018, pp. 1-287.

Anonymous, "Method and System for Retrieving Stored Media from a Social Network", An IP.com Prior Art Database Technical Disclosure, IP.com No. IPCOM000231059D, IP.com Electronic Publication Date: Sep. 25, 2013, pp. 1-3.

Anonymous, "Interfacing Assets of an Entity With a Social Media Service", An IP.com Prior Art Database Technical Disclosure, IP.com No. IPCOM000219174D, IP.com Electronic Publication Date: Jun. 25, 2012, pp. 1-22.

Anonymous, "System and method for resale of digital assets", An IP.com Prior Art Database Technical Disclosure, IP.com No. IPCOM000206691D, IP.com Electronic Publication Date: May 2, 2011, pp. 1-5.

\* cited by examiner

HOLISTIC MAPPING AND RELOCATION OF SOCIAL MEDIA ASSETS

BACKGROUND

The present invention relates generally to the field of relocating assets, and more particularly to relocating social media assets with holistic mapping.

Many times, a company will acquire another company that has social media assets or they want to consolidate multiple channels within the company. A lot of the time this requires manually backing up the assets and then manually uploading them. This can change the Uniform Resource Locators (URL's), delay search engine indexing, comments/votes/likes/dislikes can be lost, subscribers/followers can be lost, and any tags or descriptions must be re-entered when they are not automatically moved. Holistic mapping and relocation of social media assets will maintain the original URL's, complete holistic maps of attributes such as tags and description, pull the comments across different channels for summarization, and maintain current subscription levels.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for generating holistic maps and relocating social media assets. The computer may receive a plurality of social media assets to be relocated or merged from a user. A snapshot of each asset within the plurality of social media assets may be generated. The snapshot may be a record of the plurality of social media assets at any one time. A machine learning model may be generated for the plurality of social media assets based on the generated snapshot. A projected location may be identified based on the generated machine learning model. A new snapshot may be generated based on the projected location. It may be determined whether a transaction was successful based on a comparison of the snapshot with the new snapshot. An action may be performed based on the determination.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of relocating assets, and more particularly to relocating social media assets with holistic mapping. The following described exemplary embodiments provide a system, method, and program to, among other things, generate holistic maps and accurately relocate social media assets by identifying the projected location and comparing the original assets to those at the projected location in order to determine success. Therefore, the present embodiment has the capacity to improve the technical field of computer functionality by efficiently and accurately relocating social media assets through the use of holistic maps rather than manually backing up and uploading social media assets.

As previously described, many times, a company will acquire another company that has social media assets or they want to consolidate multiple channels within the company. A lot of the time this requires manually backing up the assets and then manually uploading them. This can change the URL's, delay search engine indexing, comments/votes/likes/dislikes can be lost, subscribers/followers can be lost, and any tags or descriptions must be re-entered when they are not automatically moved. Holistic mapping and relocation of social media assets will maintain the original URL's, complete holistic maps of attributes such as tags and description, pull the comments across different channels for summarization, and maintain current subscription levels.

When a company acquires another company or when a company wants to consolidate or merge multiple channels or social media accounts, this requires manual backups and uploads. For example, in order to consolidate multiple YouTube® (YouTube and all YouTube-related trademarks and logos are trademarks or registered trademarks of YouTube and/or its affiliates) channels all videos must be manually backed up on one channel and then manually uploaded to a new channel. Manually backing up and manually uploading data is neither efficient nor accurate. A lot of the time URL's are changed which can cause broken links or can require relinking if the videos were embedded somewhere else. Potential search engine indexing can be delayed or not completed because the original URL's weren't located in the search engine index cache. Any tags or descriptions may have to be re-entered because they were not automatically moved with the backup and subsequent reloading of the assets. In the case of social media, comments, votes, likes, dislikes, and other such assets can be lost along with subscribers or followers being lost. As such, it may be advantageous to, among other things, implement a system capable of mapping and relocating the social media assets without manually backing up and uploading the assets and that accurately performs such tasks.

According to one embodiment, a snapshot may initially generate of the social media assets that are to be relocated. The snapshot may then be stored in a database. A machine learning model, such as random forest modeling, may be used to create a holistic map of the social media assets. The holistic map may be used to determine a location and order of relocation that is accurate and efficient. A new snapshot may then be generated based on the projected location and compared with the original snapshot for similarities. A predetermined threshold value for the level of similarity may determine whether or not the transaction was successful. When the transaction is not successful, a rollback may be performed and the process may repeat. When the transaction is successful, a message indicating success may be communicated to the user.

Figure 1:
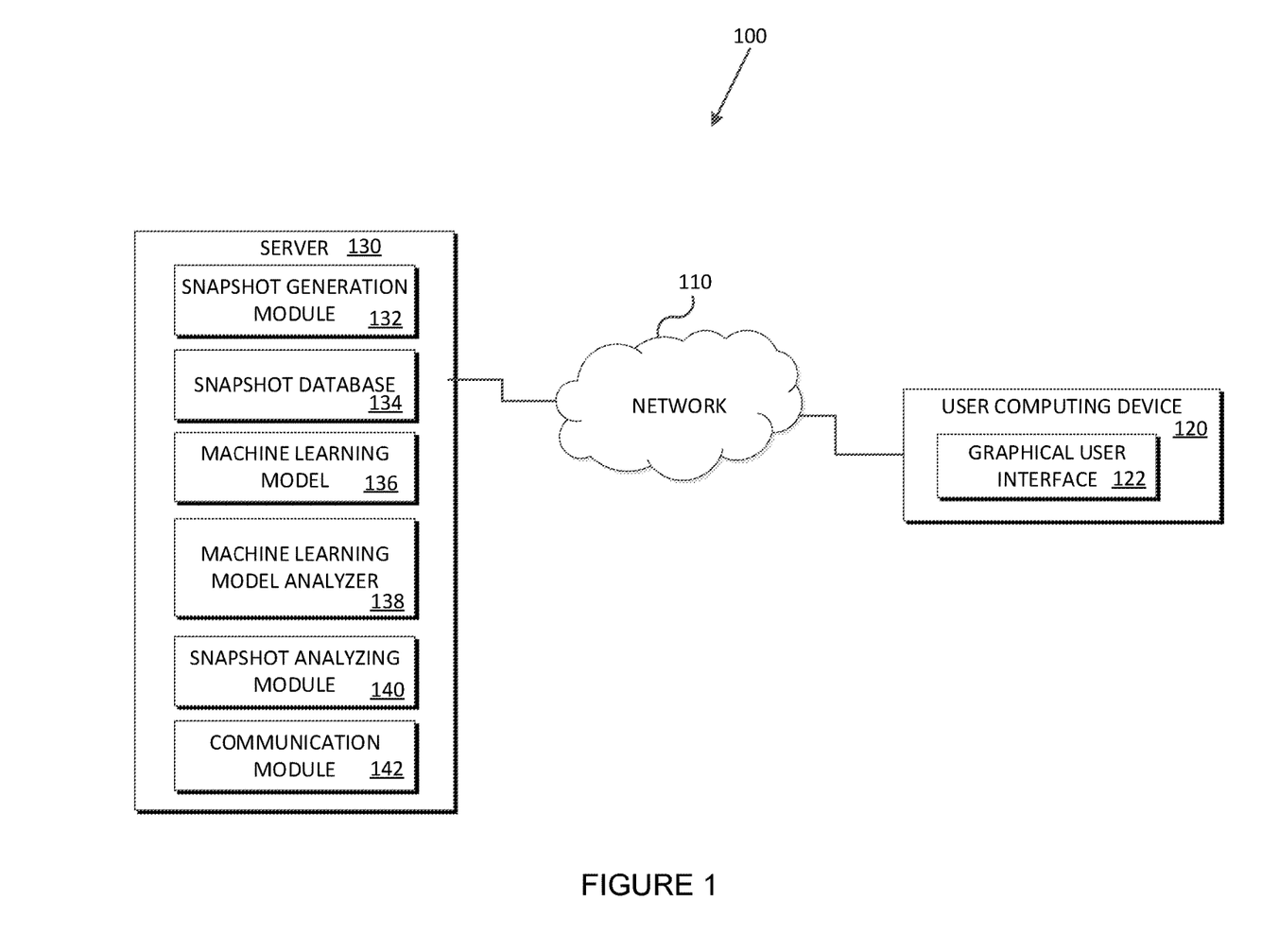
FIG. 1 is a functional block diagram illustrating a system for generating holistic maps and relocating social media assets, in accordance with an embodiment of the present invention.

FIG. 1 is a functional block diagram illustrating a system for generating holistic maps and relocating social media assets 100, in accordance with an embodiment of the present invention.

The system for generating holistic maps and relocating social media assets 100 may include a user computing device 120 and a server 130. The user computing device 120 and the server 130 are able to communicate with each other via a network 110.

The network 110 can be, for example, a local area network (LAN), a wide area network (WAN) such as the Internet, or a combination of the two, and can include wired, wireless, or fiber optic connections. In general, the network 110 can be any combination of connections and protocols that will support communications between the user computing device 120 and the server 130, in accordance with one or more embodiments of the invention.

The user computing device 120 may be any type of computing device that is capable of connecting to network 110, for example, a laptop computer, tablet computer, netbook computer, personal computer (PC), a desktop computer, a smart phone, or any programmable electronic device supporting the functionality required by one or more embodiments of the invention. The user computing device 120 may include internal and external hardware components, as described in further detail below with respect to FIG. 3. In other embodiments, the user computing device 120 may operate in a cloud computing environment, as described in further detail below with respect to FIGS. 4 and 5.

The user computing device 120 may represent a computing device that includes a user interface, for example, a graphical user interface 122. The graphical user interface 122 can be a web application, a graphical application, an editing application or any other type of application/program that allows a user to upload, change, delete, alter, or update data. The graphical user interface 122 can be any type of application that contains an interface to receive a message from a communication module 142.

The server 130 may include a snapshot generation module 132, a snapshot database 134, a machine learning model 136, a machine learning model analyzer 138, a snapshot analyzer module 140, and the communication module 142. The server 130 may also be capable of communicating with the user computing device 120, via the network 110. The server 130 may include internal and external hardware components, as depicted and described in further detail below with reference to FIG. 3. In other embodiments, the server 130 may include internal and external hardware components, as depicted and described in further detail below with respect to FIG. 4, and operate in a cloud computing environment, as depicted in FIG. 5.

The snapshot generation module 132 may generate a snapshot of the social media assets to be relocated or merged in their current state. The social media assets may be received by the communication module 142. The snapshots generated by the snapshot generation module 132 may be stored in a repository, such as the snapshot database 134. Additionally, the snapshot generation module 132 may transmit the snapshots it generates to the machine learning model 136. Furthermore, the snapshot generation module 132 may receive a request from the machine learning model analyzer 138 to generate a new snapshot based on the location determined. Then the snapshot generation module 138 may transmit the original snapshot and the new snapshot to the snapshot analyzer module 140.

The snapshot database 134 may be a data store that may store previously generated snapshots. The snapshot databased 134 may receive snapshots from the snapshot generation module 132.

The machine learning model 136 may contain the model used for generating the holistic map. The holistic map may contain the assets to be relocated or merged along with the metadata associated with them. A machine learning model, such as random forest modeling, may be contained in the machine learning model 136. Random forest modeling relocates the outputs based on mode and average regression. The machine learning model 136 may receive the snapshots from the snapshot generation module 132. Then, the machine learning model 136 may perform the random forest modeling on the snapshots received. Furthermore, the machine learning model 136 may produce a holistic map from the random forest modeling and may transmit the holistic map to the machine learning model analyzer 138.

The machine learning model analyzer 138 may analyze the holistic maps generated by the machine learning model 136. The machine learning analyzer 138 may determine the optimal location of transaction and the optimal order of transaction based on the holistic maps. The optimal location and optimal order are determined by a threshold value. The threshold value is pre-determined to produce an efficient and accurate result. The machine learning model analyzer 138 may transmit a request to the snapshot generation module 132 to generate a new snapshot based on the optimal location from the threshold value.

The snapshot analyzing module 140 may compare the original snapshot to the new snapshot. The snapshot analyzing module 140 may receive the snapshots from the snapshot generation module 132. Then the snapshot analyzing module 140 may determine the level of similarity between the original snapshot and the new snapshot. There may be a pre-determined level of similarity threshold value that allows for efficiency and accuracy. When the level of similarity is less than the threshold, the transaction may not be successful and a rollback may need to be performed. The new snapshot may be considered the current state, a new holistic map may be generated, and the snapshots may be compared until the similarities are greater than the threshold value. When the level of similarity is greater than the threshold, the transaction may be considered successful. A request to send a success message to the user may be transmitted to the communication module 142.

The communication module 142 is capable of transmitting a message to the user computing device 120. The communication module 142 may receive the request to transmit a success message to the user computing device 120 from the snapshot analyzing module 140. The communication module 142 may transmit the success message to the user computing device 120. Furthermore, the communication module 142 is also capable of receiving the social media assets to be relocated or merged from the user computing device 120. Additionally, the communication module 142 transmits the social media assets to be relocated or merged to the snapshot generation module 132.

Figure 2:
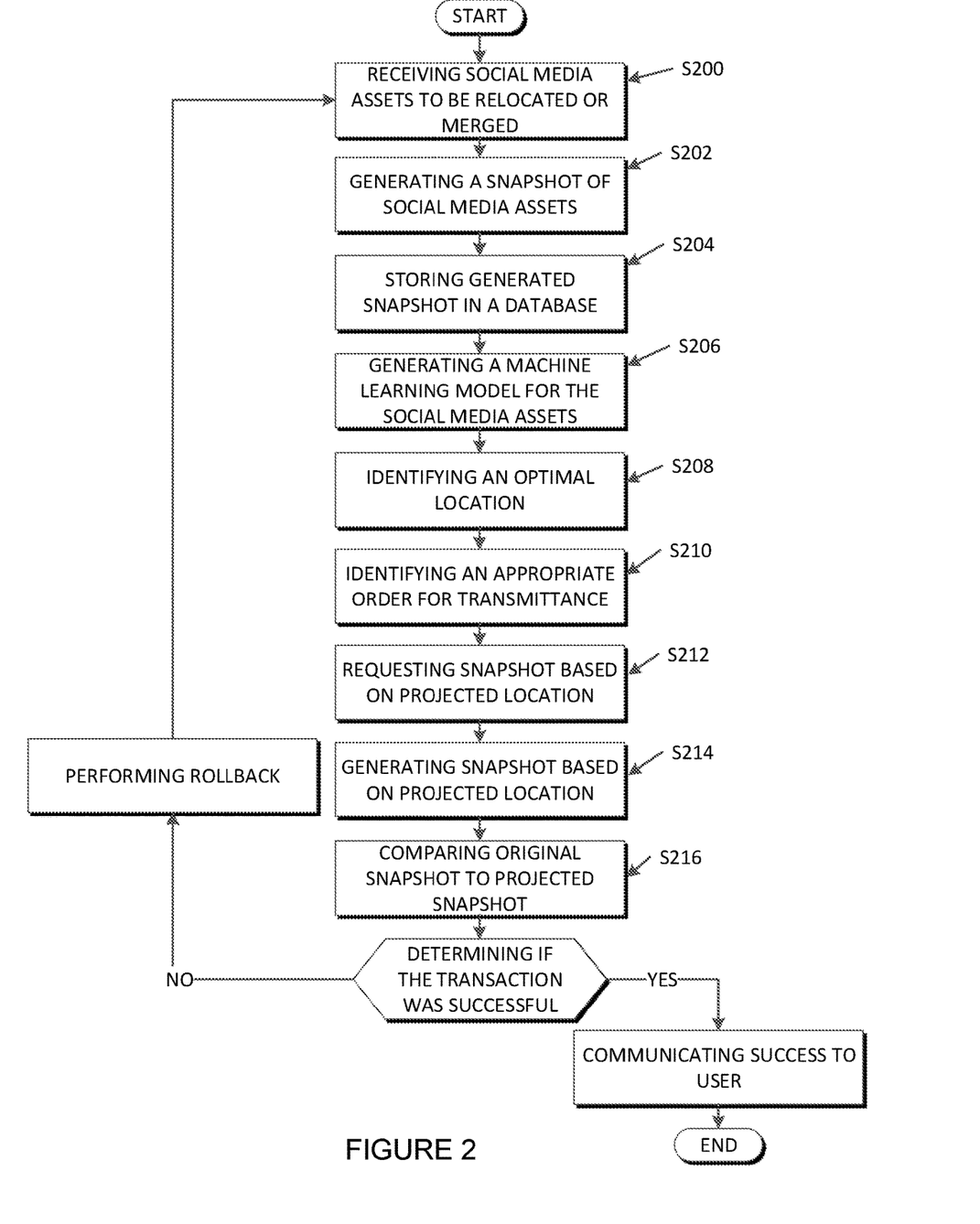
FIG. 2 is a flowchart depicting operational steps to generate holistic maps and to relocate the social media assets of FIG. 1, in accordance with an embodiment of the present invention.

FIG. 2 is an operational flowchart illustrating the server 130 generating a holistic map and relocating the social media assets. At S200, the snapshot generation module 132 receives the social media assets to be relocated or merged from the communication module 142. The user may indicate which accounts or channels are to be relocated or merged using the graphical user interface 122 on the user computing device 120. The assets to be relocated or merged may be transmitted from the user computing device 120 to the communication module 142. For example, a user can indicate two Twitter® (Twitter and all Twitter-related trademarks and logos are trademarks or registered trademarks of Twitter and/or its affiliates) accounts to be merged and the snapshot generation module 132 would receive both accounts.

Then, at S202, the snapshot generation module 132 generates a snapshot of the social media assets that are to be relocated or merged. The snapshot may be a record of the contents of a data file at any given time. This record includes all of the data including the metadata of the social media assets. The snapshot generation module 132 may receive the social media assets that the snapshot is to be generated for from the communication module 142. The snapshot generation module 132 may transmit the snapshot generated to the snapshot database 134, the machine learning model 136, and the snapshot analyzing module 140. For example, a snapshot would be taken of the two Twitter® (Twitter and all Twitter-related trademarks and logos are trademarks or registered trademarks of Twitter and/or its affiliates) accounts. The snapshot would include a record all of aspects of the accounts, including but not limited to posts, favorites, retweets, and followers.

Next, at S204, the snapshot database 134 stores the snapshots of the social media assets. The snapshot database 134 may receive a snapshot to be stored from the snapshot generation module 132. The snapshot database 134 may store all previously generated snapshots. For example, the original snapshot of the two Twitter® (Twitter and all Twitter-related trademarks and logos are trademarks or registered trademarks of Twitter and/or its affiliates) accounts would be stored in the database.

Then, at S206, the machine learning model 136 generates a machine learning model for the social media assets. The machine learning model 136 may receive the snapshot from the snapshot generation module 132. The machine learning model contained in the machine learning model 136 may be random forest modeling or other such models. Random forest modeling relocates the outputs based on mode and average regression. The machine learning model 136 may create a holistic map of the social media assets in the snapshot. The machine learning model 136 may transmit the holistic map to the machine learning model analyzer 138. For example, a holistic map of the two Twitter® (Twitter and all Twitter-related trademarks and logos are trademarks or registered trademarks of Twitter and/or its affiliates) accounts could be generated using random forest modeling.

Next, at S208, the machine learning model analyzer 138 identifies an optimal location based on a threshold value that allows for accuracy and efficiency. The machine learning model analyzer 138 may receive the holistic map from the machine learning model 136. The machine learning model analyzer 138 may contain a pre-determined threshold value that represents a location that is both accurate and efficient. The machine model analyzer 138 may analyze the holistic map and choose a location that passes the threshold value. For example, the location where the two Twitter® (Twitter and all Twitter-related trademarks and logos are trademarks or registered trademarks of Twitter and/or its affiliates) accounts are to be moved is based on a location that would provide an accurate and efficient transfer.

Then, at S210, the machine learning model analyzer 138 identifies an appropriate order for transmittance based on a threshold value that allows for accuracy and efficiency. The machine learning model analyzer 138 may receive the holistic map from the from the machine learning model 136. The machine learning model analyzer 138 may contain a pre-determined threshold value that represents an order of transmittance that is both accurate and efficient. The machine learning model analyzer 138 may analyze the holistic map and choose an order of transmittance that passes the threshold value. For example, the order of transmittance of the assets within the two Twitter® (Twitter and all Twitter-related trademarks and logos are trademarks or registered trademarks of Twitter and/or its affiliates) accounts would be accurate and efficient. It might be most efficient to transmit the followers first and then the posts, favorites, and retweets.

Next, at S212, the machine learning model analyzer 138 requests the snapshot generation module 132 to generate a snapshot based on the projected location. After the holistic map has been analyzed by the machine learning model analyzer 138, a request may be sent to the snapshot generation module 132 to generate a new snapshot. The new snapshot is to reflect any changes since the original snapshot was generated. For example, a request would be sent to generate a new snapshot of the two Twitter® (Twitter and all Twitter-related trademarks and logos are trademarks or registered trademarks of Twitter and/or its affiliates) accounts.

Then, at S214, the snapshot generation module 132 generates a snapshot based on the projected location. The snapshot generation module 132 may receive a request from the machine learning model analyzer 138 to generate a new snapshot. The snapshot generation module 132 may generate a new record of the contents of a data file at any given time. This record includes all of the data including the metadata of the social media assets. The snapshot generation module 132 may transmit the original snapshot and the new snapshot to the snapshot analyzer module 140. For example, a new snapshot would be generated of the two Twitter® (Twitter and all Twitter-related trademarks and logos are trademarks or registered trademarks of Twitter and/or its affiliates) accounts in order to reflect any significant differences from the original snapshot.

Next, at S216, the snapshot analyzer module 140 compares the original snapshot to the projected snapshot based on similarities. The snapshot analyzer module 140 may receive the original snapshot and the new snapshot to be compared. The comparison is based on similarities between the two snapshots. There is a pre-determined level of similarity threshold value that allows for efficiency and accuracy. When the two snapshots are significantly different, the transmittance wouldn't be accurate. For example, the original and new snapshot of the two Twitter® (Twitter and all Twitter-related trademarks and logos are trademarks or registered trademarks of Twitter and/or its affiliates) accounts would be analyzed for similarities to ensure the transmittance is accurate and efficient.

Then, at S218, the snapshot analyzer module 140 determines whether the transaction was successful. A transaction may be considered successful when the similarities are greater than the threshold value and the transaction may be considered a failure when the similarities are less than the threshold value. For example, the level of similarities of the original snapshot and the new snapshot of the two Twitter® (Twitter and all Twitter-related trademarks and logos are trademarks or registered trademarks of Twitter and/or its affiliates) accounts would be determined.

Next, at S220, when it is determined that the transaction was not successful, the level of similarity was less than the threshold value and the snapshot generation module 132 performs a rollback. A rollback makes it so the most recent snapshot generated becomes the original snapshot and the process starts over again. The rollback may be performed in order to ensure accuracy. For example, if a significant number of posts were made on one of the Twitter® (Twitter and all Twitter-related trademarks and logos are trademarks or registered trademarks of Twitter and/or its affiliates) accounts between the time when the original snapshot was generated and when the new snapshot was generated, a rollback would be performed.

Then, at S222, when it is determined that the transaction was successful, the communication module 142 communicates a message of success to the user computing device 120. The snapshot analyzer module 140 may transmit a message of success to the communication module 142 which may then transmit the message of success to the user computing device 120. The user views the message of success on the graphical user interface 122 of the user computing device 120. For example, when the original snapshot and new snapshot of the two Twitter® (Twitter and all Twitter-related trademarks and logos are trademarks or registered trademarks of Twitter and/or its affiliates) accounts are determined to be similar, the user will receive a message saying the merge was successful.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

Figure 3:
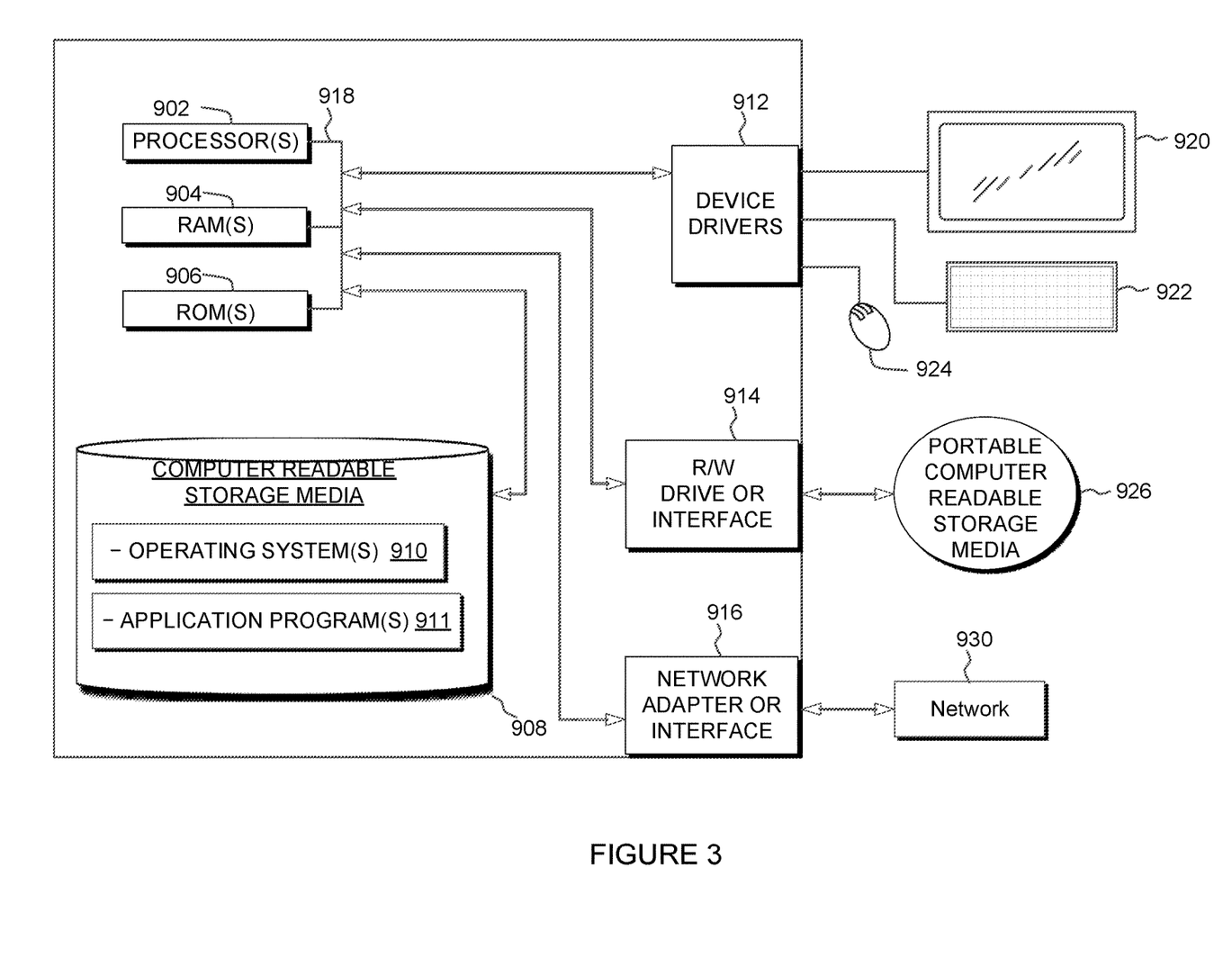
FIG. 3 is a block diagram of components of a computing device of the system for generating holistic maps and relocating social media assets of FIG. 1, in accordance with embodiments of the present invention.

FIG. 3 depicts a block diagram of components of the user computing device 120 and the server 130 of the system for generating holistic maps and relocating social media assets 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

The user computing device 120 and/or the server 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, machine learning model analyzer 138 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The user computing device 120 and/or the server 130 may also include a R/W drive or interface 914 to read from and write to one or more portable computer readable storage media 926. Application programs 911 on the user computing device 120 and/or the server 130 may be stored on one or more of the portable computer readable storage media 926, read via the respective R/W drive or interface 914 and loaded into the respective computer readable storage media 908.

The user computing device 120 and/or the server 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the user computing device 120 and/or the server 130 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The user computing device 120 and/or the server 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
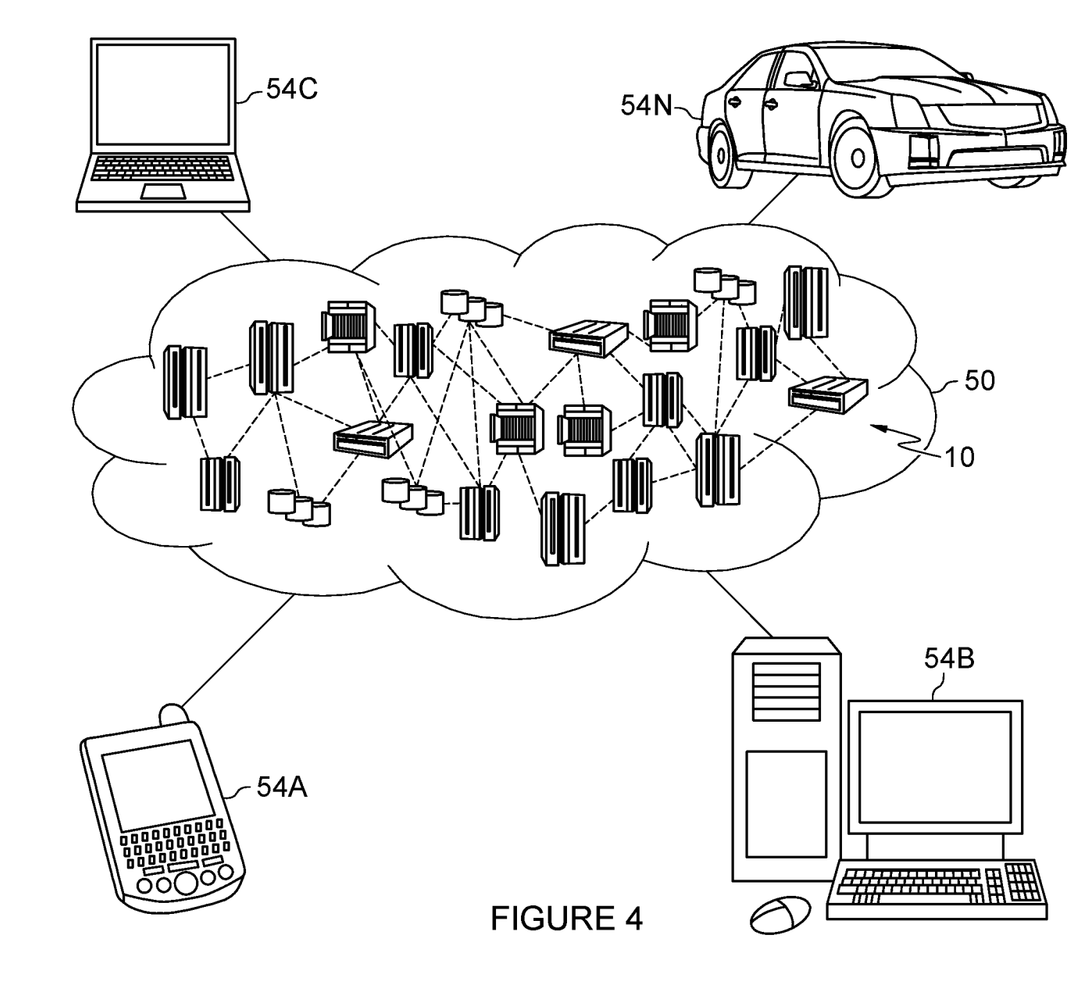
FIG. 4 depicts a cloud computing environment according to an embodiment of the present invention.
Figure 5:
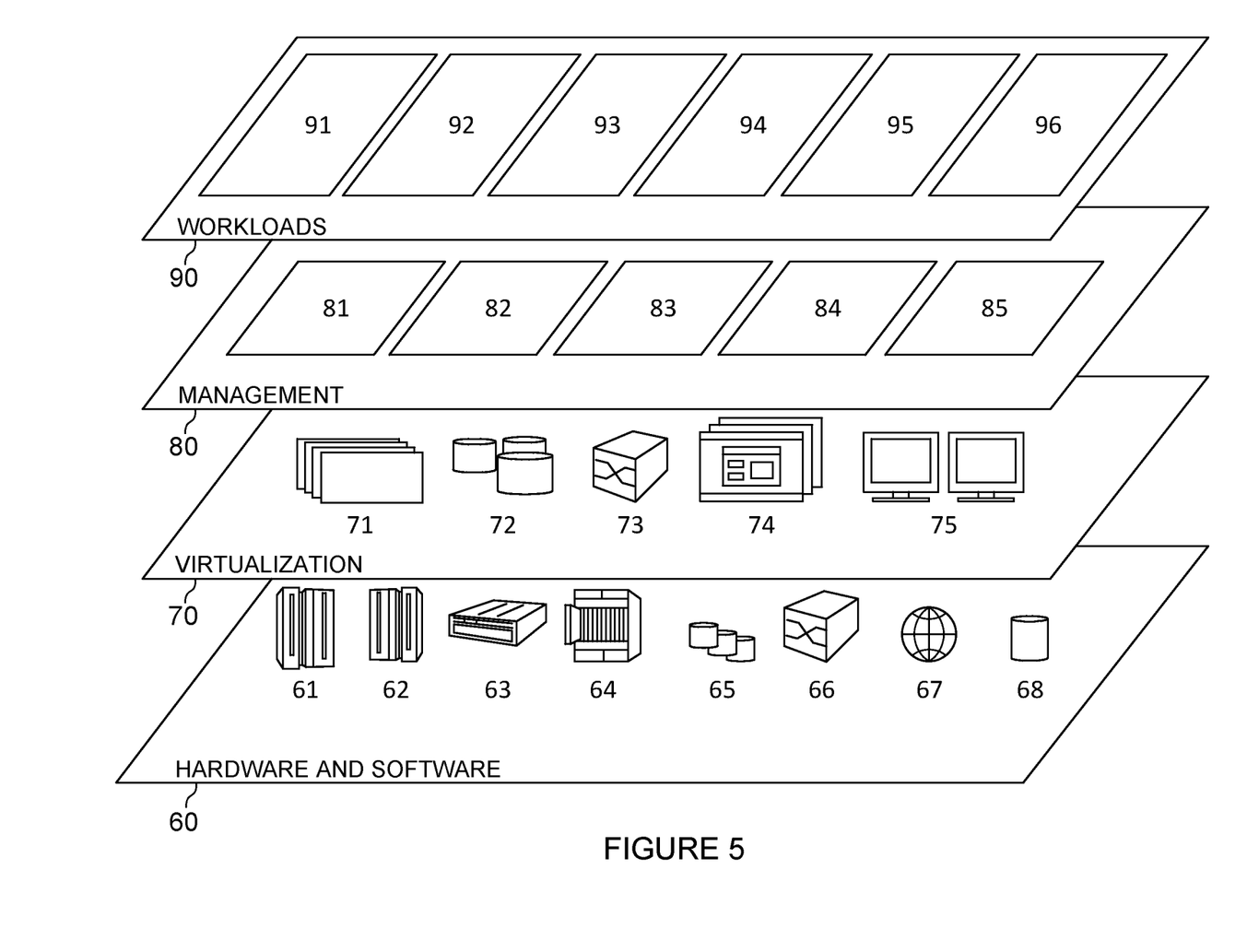
FIG. 5 depicts abstraction model layers according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social media asset mapping and relocation 96. Social media asset mapping and relocation 96 may allow a machine learning model to create a holistic map of social media assets that are to be relocated. The holistic map may be analyzed in order to perform an accurate and efficient relocation.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for generating holistic maps and relocating social media assets, the method comprising:
   receiving, by a computer, a plurality of social media assets to be relocated or merged from a user;
   generating a snapshot of each asset within the plurality of social media assets, wherein the snapshot is a record of the plurality of social media assets at any one time;
   generating a machine learning model for the plurality of social media assets based on the generated snapshot;
   identifying a projected location based on the generated machine learning model;
   generating a new snapshot based on the projected location;
   determining whether a transaction was successful based on a comparison of the snapshot with the new snapshot;
   in response to determining the transaction was not successful, performing a rollback, wherein a level of similarity is less than the pre-determined level of similarity threshold value, and wherein the rollback causes a most recent snapshot to be classified as the generated snapshot and reperforming the generation of the machine learning model, the identification, the generation of the new snapshot, and the determination; and
   performing an action based on the determination.

2. The method of claim 1, further comprising:
   comparing the snapshot with the new snapshot based on a pre-determined level of similarity threshold value.

3. The method of claim 2, wherein performing the action further comprises:
   in response to determining the transaction was successful, communicating a message of success to the user, wherein the level of similarity is greater than the pre-determined level of similarity threshold value.

4. The method of claim 1, further comprising:
   storing the generated snapshot in a database, wherein the databased stores all generated snapshots.

5. The method of claim 1, wherein the plurality of social media assets are selected from a group consisting of followers, subscribers, likes, favorites, posts, and comments.

6. The method of claim 1, wherein the projected location is based on a pre-determined threshold value that represents accuracy and efficiency.

7. The method of claim 1, wherein the machine learning model is a random forest model.

8. A computer program product for generating holistic maps and relocating social media assets, the computer program product comprising:
   one or more non-transitory computer-readable storage media and program instructions stored on the one or more non-transitory computer-readable storage media capable of performing a method, the method comprising:
   receiving, by a computer, a plurality of social media assets to be relocated or merged from a user;
   generating a snapshot of each asset within the plurality of social media assets, wherein the snapshot is a record of the plurality of social media assets at any one time;
   generating a machine learning model for the plurality of social media assets based on the generated snapshot;
   identifying a projected location based on the generated machine learning model;
   generating a new snapshot based on the projected location;
   determining whether a transaction was successful based on a comparison of the snapshot with the new snapshot;
   in response to determining the transaction was not successful, performing a rollback, wherein a level of similarity is less than the pre-determined level of similarity threshold value, and wherein the rollback causes a most recent snapshot to be classified as the generated snapshot and reperforming the generation of the machine learning model, the identification, the generation of the new snapshot, and the determination; and
   performing an action based on the determination.

9. The computer program product of claim 8, further comprising:
comparing the snapshot with the new snapshot based on a pre-determined level of similarity threshold value.

10. The computer program product of claim 9 wherein performing the action further comprises:
in response to determining the transaction was successful, communicating a message of success to the user, wherein the level of similarity is greater than the pre-determined level of similarity threshold value.

11. The computer program product of claim 8, further comprising:
storing the generated snapshot in a database, wherein the databased stores all generated snapshots.

12. The computer program product of claim 8, wherein the plurality of social media assets are selected from a group consisting of followers, subscribers, likes, favorites, posts, and comments.

13. The computer program of claim 8, wherein the projected location is based on a pre-determined threshold value that represents accuracy and efficiency.

14. The computer program of claim 8, wherein the machine learning model is a random forest model.

15. A computer system for generating holistic maps and relocating social media assets, the computer system comprising:
one or more computer processors, one or more computer-readable storage media, and program instructions stored on one or more of the computer-readable storage media for execution by at least one of the one or more processors capable of performing a method, the method comprising:
receiving, by a computer, a plurality of social media assets to be relocated or merged from a user;
generating a snapshot of each asset within the plurality of social media assets, wherein the snapshot is a record of the plurality of social media assets at any one time;
generating a machine learning model for the plurality of social media assets based on the generated snapshot;
identifying a projected location based on the generated machine learning model;
generating a new snapshot based on the projected location;
determining whether a transaction was successful based on a comparison of the snapshot with the new snapshot;
in response to determining the transaction was not successful, performing a rollback, wherein a level of similarity is less than the pre-determined level of similarity threshold value, and wherein the rollback causes a most recent snapshot to be classified as the generated snapshot and reperforming the generation of the machine learning model, the identification, the generation of the new snapshot, and the determination; and
performing an action based on the determination.

16. The computer system of claim 15, further comprising:
comparing the snapshot with the new snapshot based on a pre-determined level of similarity threshold value.

17. The computer system of claim 16, wherein performing the action further comprises:
in response to determining the transaction was successful, communicating a message of success to the user, wherein the level of similarity is greater than the pre-determined level of similarity threshold value.

* * * * *